No. 651,776.  
J. D. BOURDEAU.  
MALTED FLAKED FOOD.  
(Application filed Apr. 29, 1898.)  
Patented June 12, 1900.
(No Model.)
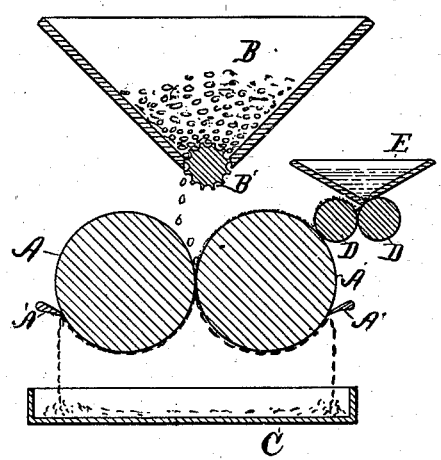
Witnesses:  
Inventor,  
Jesse D. Bourdeau  
By Fred L. Chappell  
Att'y.

UNITED STATES PATENT OFFICE.

JESSE D. BOURDEAU, OF BATTLE CREEK, MICHIGAN, ASSIGNOR TO THE BATTLE CREEK PURE FOOD COMPANY, LIMITED, OF SAME PLACE.

MALTED FLAKED FOOD.

SPECIFICATION forming part of Letters Patent No. 651,776, dated June 12, 1900.

Application filed April 29, 1898. Serial No. 679,016. (No specimens.)

*To all whom it may concern:*

Be it known that I, JESSE D. BOURDEAU, a citizen of the United States, residing at the city of Battle Creek, in the county of Calhoun and State of Michigan, have invented a certain new and useful Improved Malted Food, of which the following is a specification.

This invention relates to an improved cereal food.

It relates more particularly to an improved food with which malt is properly combined by my improved process of preparing and distributing malt through the same.

The object of the improvement is to provide a proper food product through which malt has been distributed in order that the same may be readily digested without any cooking beyond that employed in my improved process.

The food as prepared according to my improved process is well adapted for use by those having impaired digestion or who are weak from illness or are convalescent.

The objects of my invention are accomplished by the process and means described in this specification.

The invention is definitely pointed out in the claims, and I illustrate in a diagrammatical manner apparatus for performing one of the steps of my improved process.

In carrying out my invention I preferably utilize wheat, though almost any cereal can be treated by my improved process.

The steps of my improved process are: The thorough cooking and sterilization of the grain after it has of course been thoroughly cleaned. This is accomplished by steaming or boiling at a high temperature for about an hour and a quarter. The grain is slightly salted. After the grain has been cooked it is passed through a cooler, which consists, preferably, of a perforated tray or chamber, through which cold air or air of the ordinary temperature is drawn by a suction-fan, though this cooling can be otherwise accomplished. It is preferred to accomplish it by the current of cold air in this way quickly, as it practically avoids any fermentation. As soon as the grain is cooled it is dried in any suitable drier for the purpose until the grain reaches a proper consistency and toughness required for rolling, which can be determined by experience or by a little testing of the grain. When the grain has been thus properly cooled, it is placed in a hopper so constructed that it allows the grains to drop at regular intervals upon smooth heated rollers, which press each of the grains out into broad thin film-like flakes, which are taken off the rolls by adjustable scrapers. On one or both of these rolls is distributed a thin layer of malt, which as the grain is pressed against it will be absorbed into its texture and become a part of it. This step of the process is accomplished by the apparatus appearing in diagram in the accompanying drawing.

B is the hopper.

B' is a feed-roll at the bottom for discharging the grains.

A A are the crushing-rollers; A' A', the knives or scrapers; E, the fountain for malt, and D D distributing-rollers for delivering the malt evenly to the crushing-roller A.

C is a tray or pan for catching the finished product.

The heating devices for the rolls are not illustrated in this connection. As a matter of fact it is only necessary to heat the rolls before the crushing process is begun to a sufficient temperature, and thereafter the heat developed by crushing the grains will secure a sufficiently-high temperature for all practical purposes.

I merely describe this apparatus to show the manner of accomplishing this step of the process and do not attempt to cover the apparatus in this application, and wish to say, in explanation, that the rollers D D, in connection with the fountain E, are to distribute the malt evenly onto the crushing-rollers somewhat as ink is distributed to the type of a printing-machine. By the process malt is distributed and pressed into every flake or grain which is in condition to readily absorb the same, and thus completely mix the malt with the flake. The flakes are then next baked to a dark brown or after coming from the rollers may be pressed into the form of cakes before baking. By this process all of the nutritive qualities of the grain are preserved, thus rendering the flakes a staple article, while the flakes are adapted for use as food by those of impaired digestion, because they are already partially digested by the malt. The malt also acts upon the germ of the wheat and preserves the product, and thus it does not become stale. The product possesses all of the qualities of any malted food in the highest degree. It is needless to remark that after this treatment the flakes are ready for use without further cooking.

I desire to state that I sometimes impregnate the flakes with various other materials than malt by my process, though I only claim specifically the product when impregnated with malt in this application, as I claim the product and process broadly in my application for Letters Patent filed March 26, 1900, Serial No. 10,221, and in my application for Letters Patent executed May 18, 1900.

Having thus described my invention, what I claim as new, and desire to secure by Letters Patent, is—

1. The alimentary product from grain as herein described in the form of thin crisp flakes impregnated with malt, as described.

2. The alimentary product formed into thin crisp flakes or sheets impregnated with malt, as specified.

In witness whereof I have hereunto set my hand and seal in the presence of two witnesses.

JESSE D. BOURDEAU. [L. S.]

Witnesses:
O. SCOTT CLARK,
H. A. WHITNEY.